Sept. 26, 1933.  E. P. McCANNA  1,928,384
WATER SOFTENER CONTROL MECHANISM
Filed June 30, 1930  4 Sheets-Sheet 1

Inventor:
Edward P. McCanna
By Wilson, Dowell, McCanna & Rehm
Attys.

Sept. 26, 1933.   E. P. McCANNA   1,928,384
WATER SOFTENER CONTROL MECHANISM
Filed June 30, 1930   4 Sheets-Sheet 3

Inventor:
Edward P. McCanna
By
Wilson, Dowell, McCanna & Lehm
Attys.

Patented Sept. 26, 1933

1,928,384

UNITED STATES PATENT OFFICE 1,928,384

WATER SOFTENER CONTROL MECHANISM

Edward P. McCanna, Rockford, Ill., assignor, by mesne assignments, to The Permutit Company, Wilmington, Del., a corporation of Delaware Application June 30, 1930. Serial No. 464,775

23 Claims. (Cl. 210—24)

This invention relates to a base-exchange water softener having motive means for successively positioning valve means as required to convert the softener from normal softening operation to regenerating operation and back to normal softening operation, or to cause the softener to perform in due order its functions other than normal and to resume normal functioning; and the main object of the invention is to provide for such apparatus an improved control mechanism whereby pursuant to the starting of the motor the entire cycle of operation of the apparatus is effected and the motor thereupon stops, while during the cycle the operation of the motor when it has brought the valve means to a position other than normal is automatically interrupted for a predetermined time interval and then automatically resumed for the ensuing shifting of the valve means to the next operative position. Among other features the invention provides an organization whereby the motor when it shifts the valve means to an operative position is controlled to stop by means operated with the valve means, and after such shifting to an operative position other than normal is controlled to resume its operation for the next positioning of the valve means by a means operating under control of timing means. Another feature resides in the employment of an escapement mechanism for timing the intervals of interruption of the operation of the motor. These and other features of the invention will be apparent from the following description taken with reference to the accompanying drawings, wherein one illustrative embodiment of the invention is shown for example.

In said drawings:—

The same or similar reference numerals are applied to corresponding parts throughout the views.

Figure 1:
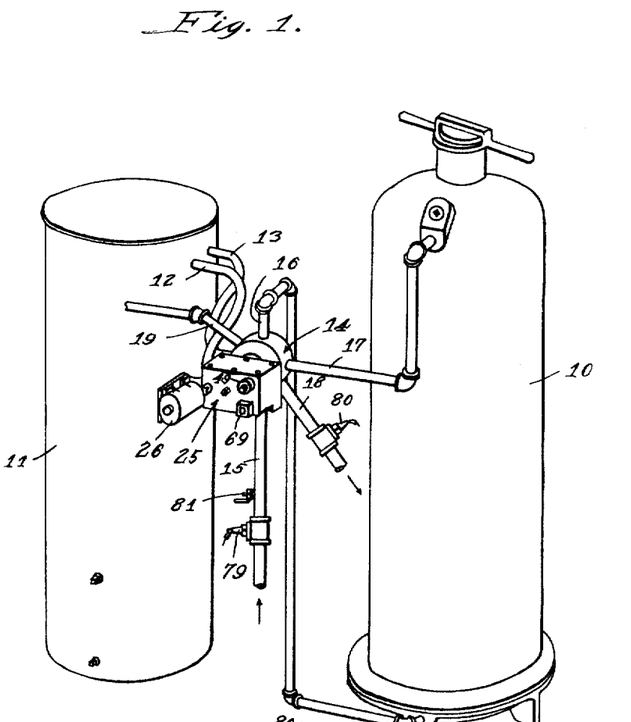
Figure 1 is a perspective view of a water softener equipped with a control mechanism made in accordance with my invention.

The invention is illustrated in connection with a water softening apparatus consisting of a softener tank 10 containing a bed of base-exchange material and brine tank 11. The latter is of the type disclosed in the copending application of Harwood et al., Serial No. 158,458, filed January 3, 1927, having an upper salt compartment and a lower brine compartment which are in open communication with one another only between regenerations, and having a hose 12 for injecting water into the brine compartment to expel the brine therefrom through another hose 13. The valve means illustrated conforms to the disclosure of the copending application of Colvin, Serial No. 337,754, filed February 6, 1929, the same being a multi-port plate type valve 14 having a hard water supply pipe 15 connected with the body thereof at a predetermined point with reference to a pipe 16 leading to the bottom of the softener tank 10, a pipe 17 connected with the top of the softener tank, a service pipe 18 for delivering the outgoing softened water to the service system communicating therewith, and a waste pipe 19 leading to the sewer. The hoses 12 and 13 are also connected with the body of the valve 14 in a predetermined relation to the pipes just mentioned. The valve 14 is shown in section in Fig. 3 in which the numeral 20 is applied to the body of the valve, having a bonnet 21 enclosing the ported rotor 22, which is held in contact with the ported face of the body 20 by means of a leaf spring 23 provided beneath the bonnet. The stem 24 is arranged to turn the rotor 22 relative to the body 20 to either one of three positions for softening, salt wash, and rinse.

In the softening position, as described in the Colvin application, the hard water supplied through pipe 15 is delivered through pipe 16 to the bottom of the softener tank 10 for passage upwardly through the latter, and the softened water leaving the top of the tank through pipe 17 is delivered to the service system through pipe 18. In the salt wash position of the valve, which is 90° advanced in a counter-clockwise direction with reference to the softening position, water is supplied through pipe 15 and introduced into the brine compartment of the brine tank 11 through hose 12 to expel the brine therefrom through hose 13, and the brine is delivered through pipe 17 to the top of the softener tank for passage downwardly therethrough for regeneration of the zeolite bed. The waste water leaving the bottom of the tank through pipe 16 is discharged through pipe 19 to the sewer. In the rinse position of the valve, which is 90° advanced with reference to the salt wash position, the water supplied through pipe 15 is admitted to the lower end of the softener tank 10 through pipe 16 for passage upwardly through the bed, and the outgoing waste water flows through pipe 17 and pipe 19 to the sewer. Following the rinse, the valve must be shifted through 180° to bring it back to the original position for softening. So much for a general explanation of the operation of the water softening apparatus in connection with which I have illustrated my improved control mechanism.

Figure 3:
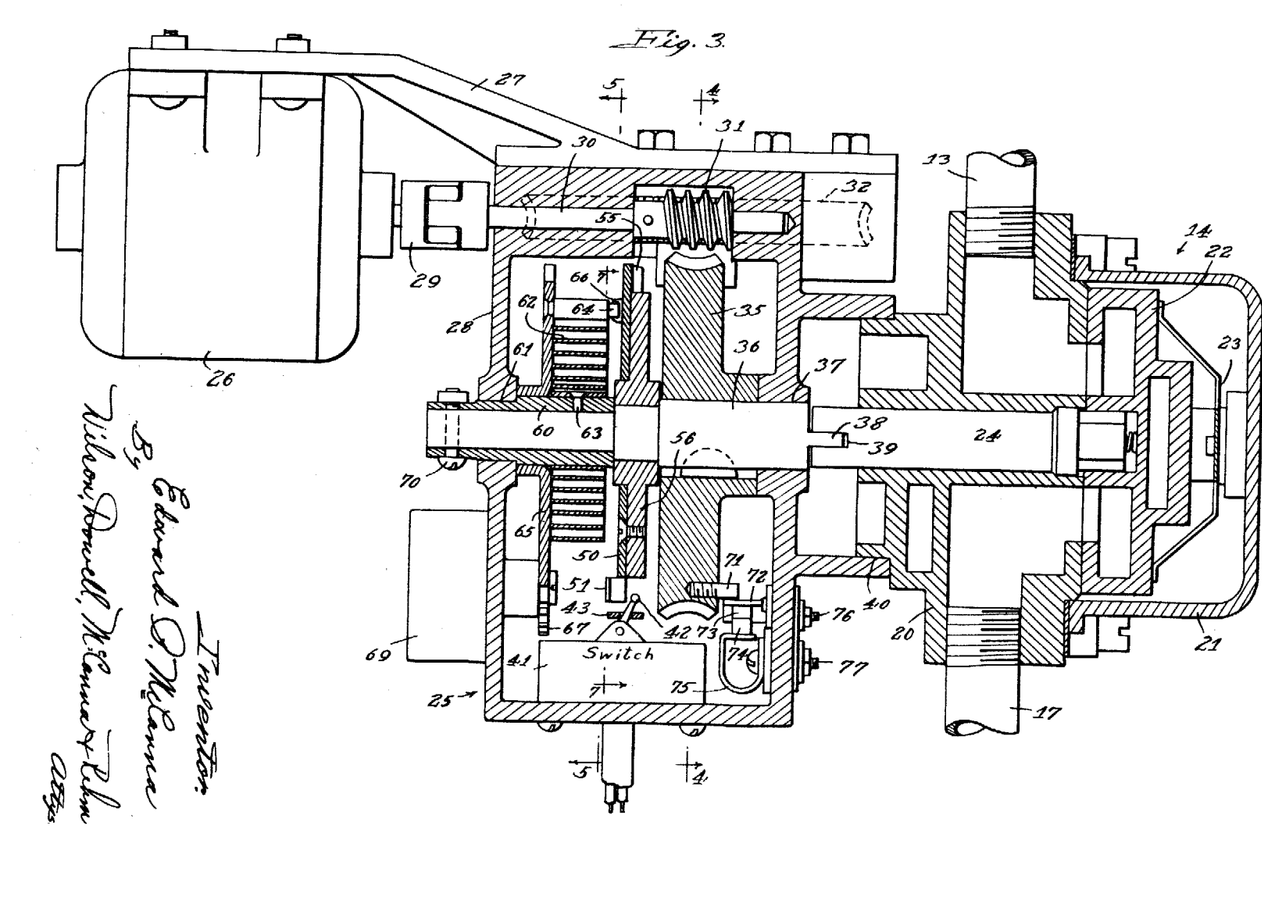
Fig. 3 is a longitudinal horizontal section through the control mechanism.
Figure 4:
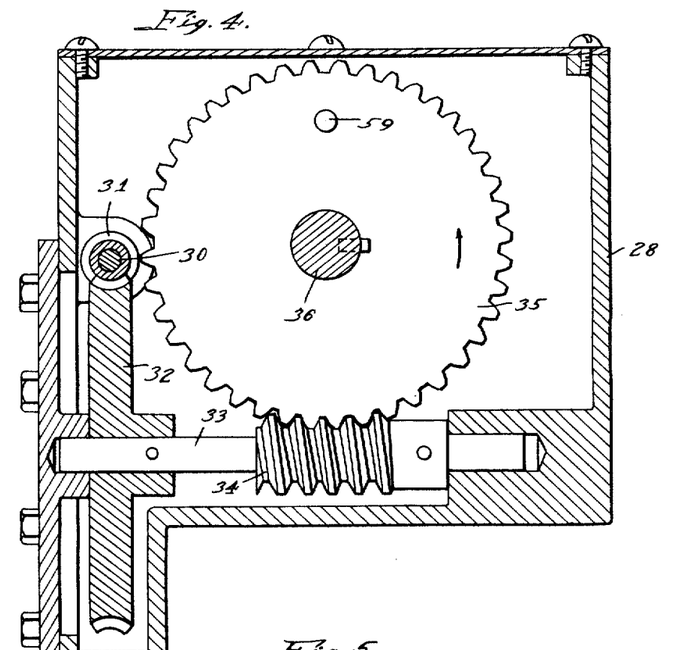
Figs. 4 and 5 are vertical cross-sections taken on the lines 4—4 and 5—5 of Fig. 3.

The control mechanism is designated generally by the reference numeral 25 and is interposed between the valve 14 and the electric motor 26 provided for operation of the valve. The motor 26 is mounted on a bracket 27 fixed to the housing 28 of the control mechanism, as shown in Fig. 3, and has a flexible coupling connection at 29 with a shaft 30 mounted in suitable bearings in the housing and extending therefrom as shown. A worm 31, pinned or otherwise suitably fixed on the shaft 30, meshes with a worm gear 32 to complete one of two stages of a reduction drive between the motor 26 and the valve stem 24. A shaft 33, to which the worm gear 32 is fixed, is also received in suitable bearings in the housing 28 and has a worm 34 thereon meshing with a worm gear 35 keyed, or otherwise suitably secured, to a shaft 36. The shaft 36 has one end thereof received in a bearing 37 provided in the housing 28 and at this end it also has a detachable coupling connection with the valve stem 24, as by means of a tongue 38 on the shaft entered in a cross-slot 39 provided in the end of the stem. The housing 28 provides a suitable mounting for the body 20 of the valve 14, as indicated at 40. It is, no doubt, clear from this description that the rotor 22 and stem 24 of the valve 14 are arranged to be turned whenever the motor 26 is operated. The control mechanism 25 embodies means, as will now be described, whereby once the operation of the motor 26 has been initiated, in whatever manner, to shift the valve from softening position at the commencement of regeneration, the motor is automatically stopped when the valve reaches the salt wash position, and is kept at rest for a predetermined interval for the salt wash operation to be completed. Then the motor is started again to shift the valve from salt wash to rinse position and is again stopped and kept at rest for a predetermined interval for the rinse operation to be completed. Then it is started again to shift the valve from the rinse position back to the softening position and, finally, stopped again.

Figure 5:
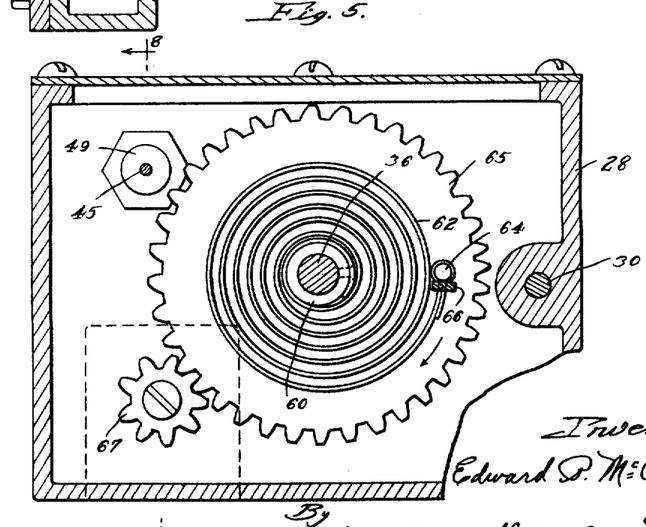

A toggle type switch 41 is provided to control the motor 26 and has a lever 42 arranged to be oscillated by means of an arm 43 pivoted at 44 to the casing of the switch and having the lever 42 extending through an opening therein. A plunger rod 45 has connection with the free end of the arm 43, as shown in Fig. 8, and may be provided with a knob 46 for manual operation of the switch to start the motor, although I have also shown an armature 47 on the plunger for cooperation with a solenoid coil 48 to attend to the operation of the switch automatically, as by completion of an electric circuit through the solenoid fully or semi-automatically, as will hereinafter appear, or by remote control, as by depression of a push button for completing a circuit through the solenoid, as will presently appear. The solenoid 48 is carried on a plug 49 mounted on the wall of the casing 28 and having the plunger rod 45 projecting therethrough. In addition to being operable by means of the arm 43 the switch lever 42 is operable first in one direction and then in the other by means of a cam disc 50. The latter has lugs 51, 52 and 53 struck therefrom and projecting in one direction at an acute angle with reference to the plane of the disc and all arranged to move the switch lever 42 in one direction for stopping the motor, and similar lugs 54 and 55 struck from the disc and projecting in the other direction for moving the switch lever 42 in the opposite direction. The cam disc is fixed, as by means of screws as shown, to a wheel 56 rotatably received on a slightly reduced portion of the shaft 36, next to the worm gear 35. Two knobs 57 and 58 are provided on the side of the wheel 56 on the same radius and circumferentially spaced approximately 90°. Another knob 59, on the same radius with respect to the shaft 36 as the knobs 57 and 58, is provided on the side of the worm gear 35 between the knobs 57 and 58 (see Figs. 6 and 7). This provides for certain cooperation between the worm gear 35 and wheel 56 for operation of the cam disc 50, as will presently appear. A sleeve 60 is received on a further reduced end portion of the shaft 36 alongside the wheel 56, and is received in a bearing 61 provided in the wall of the housing 28, through which the sleeve projects with the end of the shaft, as shown. A spiral spring 62 has the inner end thereof fixed to the sleeve 60, as at 63, and has the outer end thereof secured to a pin 64 mounted on a spur gear 65, which in turn is mounted for rotation on the sleeve 60. The outer end of the pin 64 is arranged to come into engagement with a lug 66 struck from the disc 50 on a slightly smaller radius than the lugs 51—55, previously referred to. The spur gear 65 meshes with a pinion 67 fixed on a shaft 68 extending into the casing 69 of an escapement. The escapement may be of any well known or preferred type, such, for example, as are used on automatic toasters. There is thought to be no need for illustrating the same. It will suffice to state that the shaft 68 carries the endmost gear of the reduction train of the escapement so that the pinion 67 is capable of turning only very slowly and the spur gear 65 proportionately slower. The spring 62 normally tends to turn the gear 65 in a clockwise direction, as viewed in Fig. 5, but its operation is impeded by the escapement which limits the gear 65 to very slow movement as stated before. Movement of the gear 65 under action of the spring is arranged to be communicated to the cam disc 50 and wheel 56. The cam disc and wheel are also arranged to be turned with the worm gear 35 by engagement of the knob 59 on the gear with the knob 57 on the wheel. When the worm gear 35 is at rest and the knob 58 comes into engagement with the knob 59, the cam disc 50 and wheel 56 are naturally held against turning regardless of the pressure of the pin 64 on the lug 66 under action of the spring 62. This relationship of the parts exists when the valve is in normal softening position. The spring 62 is arranged to be wound by turning the sleeve 60 from without the casing 28 and when it has the proper tension the sleeve 60 is fixed to the shaft 36 by means of a bolt 70 passed through registering holes provided in the sleeve and shaft. The fact that the shaft 36 is given one complete turn in each cycle of operations of the valve and the spur gear 65 is arranged to go through only one complete revolution in each cycle means that the spring 62 never experiences any perceptible change in tension. In passing, it will be observed that a pin 71 is provided on the back of the worm gear 35, which is arranged, when the valve is in softening position, to press the free end of a leaf spring 72 downwardly to engage a contact 73, mounted on the leaf spring, with another contact 74 carried on an arm 75. The leaf spring 72 is connected with a terminal 76 insulated from the housing 28, and the arm 75 is connected with another terminal 77 also insulated from the housing. The contacts 73 and 74 are otherwise out of engagement.

Figure 6:
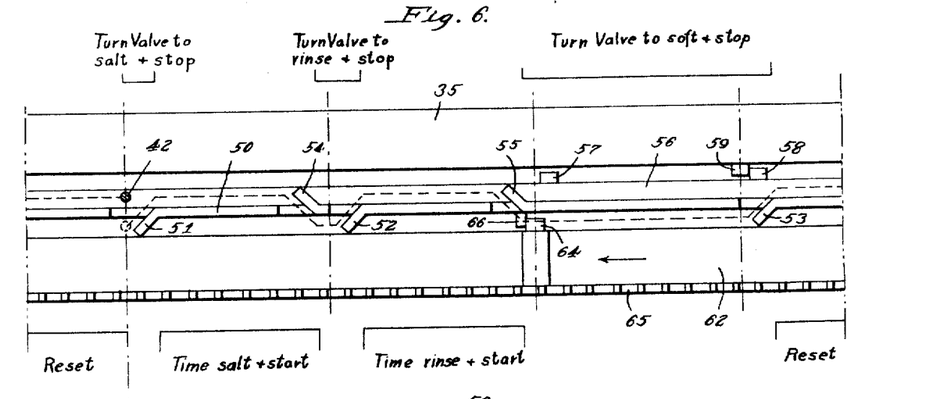
Fig. 6 is a developed view of the switch operating cam disc and the motor driven worm gear and spring actuated spur gear that cooperate therewith.
Figures 7, 8, 9:
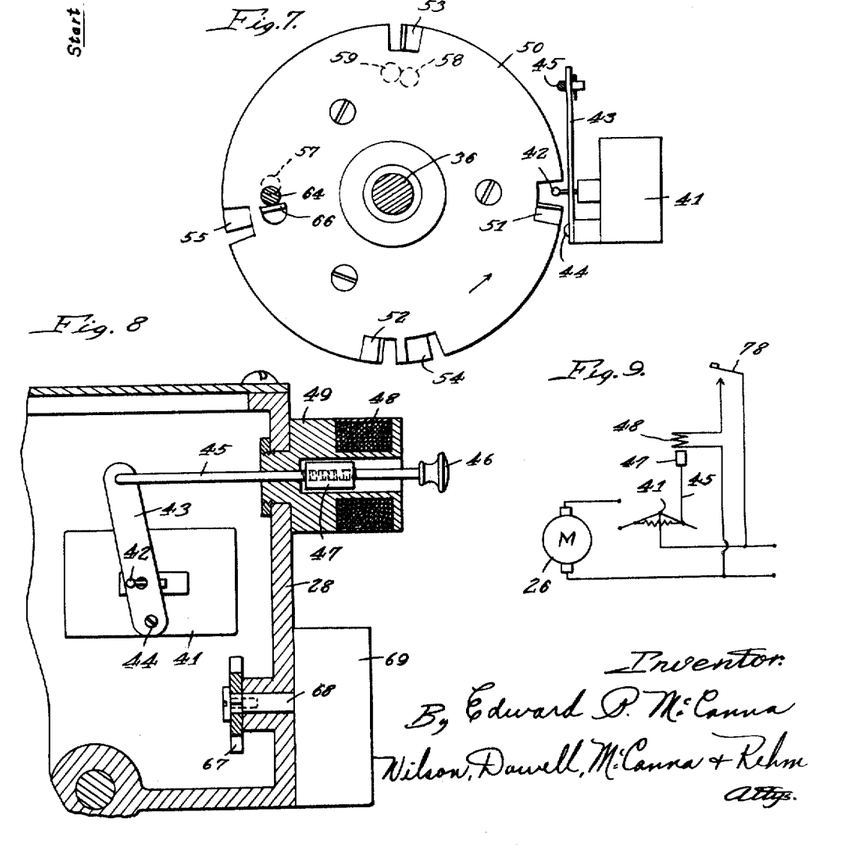
Fig. 7 is a sectional detail on the line 7—7 of Fig. 3 showing the cam disc in side elevation.
Fig. 8 is a sectional detail on the line 8—8 of Fig. 5.
Fig. 9 is an electrical wiring diagram similar to Fig. 2, but showing a push button for starting the operation of the control mechanism for regeneration.

In operation, assuming for the time being that the softener in connection with which the control mechanism is used is arranged to be thrown into regeneration manually, after a soap test indicates that regeneration is necessary, the switch 41 will be closed by pulling out on the knob 46, thereby throwing the lever 42 from the full line position shown in Fig. 6, on one side of the cam disc 50, to the dotted line position on the other side of said disc. This starts the motor 26 and it turns the worm gear 35 through the two stages of gear reduction 31—32 and 34—35, thereby turning the shaft 36 and the valve stem 24 and rotor 22 of the valve 14. It takes only a few seconds to turn the valve from softening position to salt wash position. Referring to Fig. 6, it will be seen that the knob 59 on the worm gear 35 moves away from the knob 58 toward the knob 57 in the turning of the gear. Of course, the moment the knob 58 is no longer held by the knob 59 the cam disc 50 and spur gear 65 are free to turn under the action of the spring 62, but their movement is very slow owing to the restraint of the escapement 69. The knob 59, therefore, overtakes the knob 57 in a few seconds and the cam disc 50 is turned with the worm gear 35 but only for a brief interval, because the lug 51 comes into engagement with the end of the switch lever 42 and throws it back to its first position, thereby stopping the motor. The extent of movement of the disc 50 mainly under the action of the gear 35 is indicated by the short full line at the upper left hand corner of the figure above which appears the note " Turn valve to salt & stop ". After a predetermined interval of time, say, from 20 to 30 minutes, depending on the length of time required for the salt wash operation to be completed, during all of which time the gear 65, under the action of the spring 62, continues to turn and drive the escapement, the pin 64, after overtaking the lug 66, turns the cam disc 50 and eventually the lug 54 throws the switch lever 42 back to closed position to start the motor 26 again. The motor drives the worm gear 35 again and turns the valve from salt wash position to rinse position. At the commencement of this operation of the motor the knob 59 is as far removed from the knob 57, as shown in Fig. 6, owing to the fact that after the previous stop of the motor the gear 65 turned the cam disc 50 at a distance indicated by the full line beneath the figure, bearing the legend " Time salt & start ", meaning that during this interval, while the cam disc 50 is being turned, the salt wash operation is being timed and at the end of this operation the motor is started. In a few seconds the knob 59 overtakes the knob 57 and moves the cam disc 50 a short distance sufficient to have the lug 52 come into engagement with the switch lever 42 and throw it to the other side of the disc to open circuit position, so as to stop the motor. The extent of movement of the disc is indicated by the short full line above the figure labeled " Turn valve to rinse & stop ". While the valve is in the rinse position the gear 65 under the action of spring 62, drives the escapement 69 and turns the cam disc 50 through a distance indicated by the full line below the figure labeled " Time rinse & start ", meaning that during this turning of the cam disc the rinse operation is timed and that at the end of the movement the lug 55 comes in contact with the switch lever 42 and throws it to closed circuit position to start the motor again. It will be seen by comparison of the two lines below the figure " Time salt & start " and " Time rinse & start " that approximately the same length of time is allowed for rinsing as for salting, but it will be evident that these times may be varied by properly locating the lugs 54 and 55, it being obvious that if either one of these lugs is advanced the time interval determined thereby is shortened, and vice versa. When the motor starts again it turns the valve from rinse position back to softening position and then stops, as indicated by the full line above the figure labeled " Turn valve to soft and stop ". At the end of this movement the lug 53 comes into engagement with the switch lever 42 and throws it to open circuit position. Following that, the gear 65, under the action of spring 62, drives the escapement and the pin 64 soon overtakes the lug 66, and the cam disc 50 is turned until the knob 58 comes into contact with the knob 59, which is the situation illustrated in Fig. 6. The extent of movement of the cam disc 50 mainly by the pin 64 is indicated by the full line below the figure marked " Reset ". It will be observed that the lines labeled " Turn valve to soft and stop " and " Reset " are much longer than the other lines; this is due to the fact that the operations of the valve from softening position to salt wash position and from salt wash position to rinse position are through only 90°, whereas the operation of the valve from rinse position back to softening position is through 180°.

In Fig. 9 I have illustrated an arrangement whereby the toggle switch 41 may be closed, without a manual pull on the knob 46, from a remote point by simply depressing the push button 78. This closes a circuit through the solenoid 48 and the armature 47 communicates a pull to the plunger 45 and throws the switch 41 to close the circuit through the motor 26. In this way, the user can throw the softener into regeneration by simply pressing a button located wherever convenient when the condition of the water indicates the necessity for regeneration. It is clear from the foregoing description that once the regeneration has been initiated by starting the motor 26 the control mechanism will attend to the cycle of operations automatically.

Figure 2:
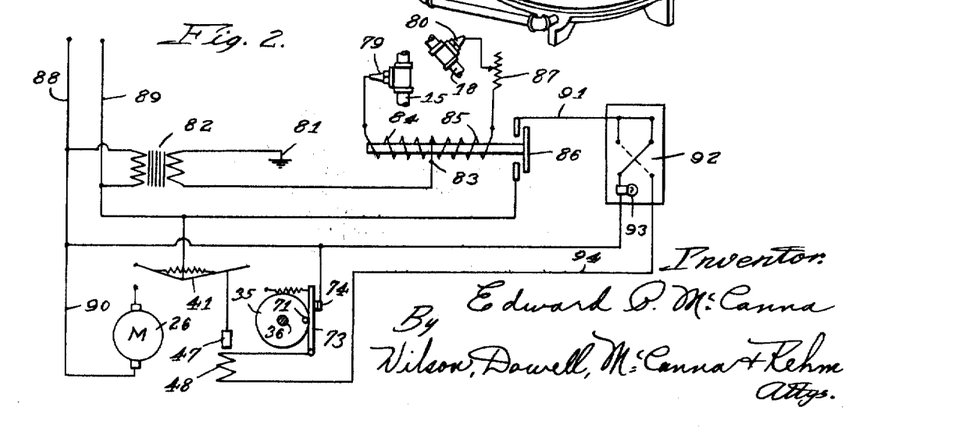
Fig. 2 is an electrical wiring diagram showing the use of my control mechanism in connection with a softener arranged for fully or semi-automatic operation and having an electrical conductivity testing means in connection therewith for determining when the softener requires regeneration.

In Fig. 2, I have illustrated an arrangement permitting fully automatic or semi-automatic operation. In this case, two conductivity cells 79 and 80, similar to those disclosed in the copending application of O. R. Sweeney et al., Serial No. 403,637, filed October 30, 1929, are provided, the former in the incoming hard water line 15 and the latter in the outgoing soft water line 18. A step-down transformer 82 provides low voltage current from the high voltage line, and one side of the secondary coil is connected with the ground 81 preferably on the hard water line 15 and the other side is connected at 83, between the opposing cells 84 and 85 provided in connection with a relay 86. The coil 84 has its other end connected with the cell 79, and the coil 85 has its other end connected with the cell 80 through a variable resistance 87. 88 and 89 designate the line conductors across which the transformer 82 is connected. The motor 26 has one side thereof connected with the conductor 88, as at 90, and the other side thereof is arranged to be connected with the conductor 89 through switch 41. The conductor 89 is connected to one terminal of the relay 86 and a connection is made at 91 between the other terminal and two poles of the two-way switch 92. The conductor 88 has connection through a signal light 93 with one of the two other poles of the switch 92, and a conductor 94 connected to the remaining pole has connection with one end of the solenoid 48, the other end being arranged to be connected with the conductor 88 through the contacts 73 and 74. In operation, when the softener is delivering soft water, the resistance 87 is varied to balance the "pull" of the coils 84 and 85, it being well known that the conductivity of soft water is less than that of hard water, and this difference is made up by additional resistance at 87. So long as the outgoing water is soft, the coils 84 and 85 exert balanced forces and the relay 86 remains opened, but when the outgoing water contains calcium and magnesium salts to a predetermined concentration, the resistance through that branch including the coil 85 is greater than through that branch including the coil 84 and consequently the coil 84 overbalances the coil 85 and closes the relay 86. Assume, then, that the switch 92 is in the full line position. If that is the case, a circuit is completed from conductor 89 through relay 86, conductor 91, switch 92 and signal light 93 back to conductor 88. The signal 93 may be in the kitchen along with the switch 92, and, when the light 93 indicates the necessity for regeneration, the user can throw the switch 92 to the dotted line position whenever it would be convenient to have the softener thrown into regeneration. When the switch 92 has been thrown to the dotted line position, a circuit is completed from conductor 89 through relay 86 and conductor 91 to conductor 94, and through solenoid 48 and contacts 73 and 74 back to conductor 88, thereby energizing the solenoid 48 and causing the switch 41 to be closed. This starts the motor 26 and, as stated before, the control mechanism thereafter attends to the control of the operations of the valve through the cycle automatically. Naturally, where a two-way switch is provided in connection with the signal light the operation may or may not be semi-automatic depending on whether or not the switch is left in the full line position during the capacity run. Fully automatic operation would, of course, be secured by leaving the switch in the dotted line position at all times It is believed the foregoing description conveys a clear understanding of all of the objects and advantages of my invention. While I have illustrated the invention as employed in connection with one specific form of a water softening apparatus and one specific form of valve means it should be understood that there is no special limitation as to the application of the invention, but that the same might be used in connection with various forms of water softening apparatus and different forms of valve means. Then, too, while the mechanism has been described as applied to a softener having two-step regeneration it should be evident from the foregoing description that by a simple change in the number of lugs on the cam disc 50, any number of steps of regeneration may be provided for. The appended claims have been drawn with a view to covering all legitimate modifications and adaptations.

I claim:

1. In a water softener control mechanism, the combination with valve means and an electric motor arranged when operated to shift the valve means, of a switch for opening and closing the circuit through the motor, means operated with the valve means in the shifting thereof to throw the switch to open circuit position whereby to determine the position in which the valve means is left, timing means for determining the length of time the valve means is left in a certain position, and means operated with the timing means for throwing the switch to closed circuit position.

2. In a water softener control mechanism, the combination with valve means and a motive means for shifting the valve means, of a control means for rendering the motive means operative and inoperative, a second means for operating the control means in one direction to start the motive means and in the opposite direction to stop the same, means whereby the second means is operated with the valve means in the shifting of the latter to cause stopping of the motive means whereby to determine the position in which the valve means is left, a timing means for determining the length of time during which the valve means is left in a given position, and means operated with the timing means for operating the second means to start the motive means.

3. A control mechanism as set forth in claim 2 wherein the second means comprises a cam disc having oppositely directed cam surfaces for cooperation with the control means in operating the latter first in one direction and then in the opposite direction, said disc being arranged to be advanced through one complete revolution in a cycle of operations and being operable through a given angularity of advancement first with the valve means and then with the timing means.

4. A control mechanism as set forth in claim 2 wherein the second means comprises a cam disc having oppositely directed cam surfaces for cooperation with the control means in operating the latter first in one direction and then in the opposite direction, said disc being arranged to be advanced through one complete revolution in a cycle of operations and being operable through a given angularity of advancement several times with the valve means and several times with the timing means, the operation thereof alternating between the valve means and timing means, being first with the one and then with the other whereby to predetermine several positions of the valve means and predetermine the time intervals during which the valve means remains in the different positions.

5. In a water softener control mechanism, the combination with valve means, and motive means for operating the same to different positions, of a control means for rendering the motive means operative and inoperative, said control means being arranged to be operated when the softener requires regeneration to start a cycle of operations of the valve means from softening position through one or more intermediate positions back to softening position, means operated with the valve means arranged to operate said control means to stop the motive means when the valve means has been brought to the first position of regeneration, an escapement mechanism arranged to be set into operation upon shifting of the valve means, and means controlled by the escapement mechanism and arranged to operate the control means after a predetermined period of operation of the escapement mechanism to start the motive means whereby to shift the valve means from the first position of regeneration.

6. In a water softener control mechanism, the combination with valve means, and a motor for shifting the same, of a switch for controlling the operation of the motor, the same being arranged to be thrown to closed circuit position when the softener requires regeneration whereby to start a cycle of operations of the valve means, means arranged to throw the switch to open circuit position when the valve means is brought to the first position of regeneration whereby to determine the position of the valve means, an escapement mechanism set into operation when the valve means is shifted for determining the length of time the valve means is left in said positon, and means arranged to throw the switch to closed circuit position after a predetermined amount of operation of the escapement mechanism whereby to shift the valve means from the first position of regeneration.

7. In a water softener control mechanism, the combination with valve means and a motor for shifting the same, of means arranged to close the circuit for the motor when the softener requires regeneration whereby to start a cycle of operations of the valve means from softening position through one or more intermediate positions back to softening position, means for opening the circuit through the motor when the valve means is brought to the first position of regeneration, an escapement mechanism arranged to operate when the valve means is in any position except softening position, and means controlled by the escapement mechanism for closing the circuit through the motor to cause shifting of the valve means after a predetermined amount of operation of the escapement mechanism.

8. In a water softener control mechanism, the combination with valve means and a motor for shifting the same from softening position through several intermediate positions back to softening position, of means for closing a circuit through the motor when the softener requires regeneration whereby to start a cycle of operations of the valve means, means for opening the motor circuit at each of several predetermined positions of the valve means, an escapement mechanism arranged to be operated whenever the valve means is in a position other than softening position, and means controlled by the escapement mechanism for closing the motor circuit after a predetermined period of operation of the escapement mechanism.

9. In a water softener control mechanism, the combination with valve means and a motor for shifting the same from softening position through several intermediate positions back to softening position, of means for closing a circuit through the motor when the softener requires regeneration whereby to start a cycle of operations of the valve means, a plurality of means for opening the motor circuit at different points in the shifting of the valve means whereby to predetermine a plurality of positions of the valve means, including the softening position, an escapement mechanism arranged to be operated when the valve means is in any position except softening position, and plural means controlled by the escapement mechanism for closing the motor circuit after predetermined periods of operation of the escapement mechanism in the different intermediate positions of the valve means.

10. In a water softener control mechanism, the combination with valve means, and a motor for shifting the same from softening position through one or more intermediate positions back to softening position, of a normally open switch for controlling the motor circuit adapted to be closed when the softener requires regeneration whereby to start the cycle of operations of the valve means, a shaft driven by the motor through suitable reduction gearing and serving to operate the valve means, the end gear of the train of reduction gearing being mounted on said shaft to turn the same, a cam disc mounted freely on the shaft alongside the gear, means on the gear arranged to turn the disc to open the switch when the valve means is in the first position of regeneration, spring means kept wound by the turning of said shaft, an escapement mechanism driven by the spring means and arranged to operate when the valve means is in any position but softening position, and means also operable by the spring means for turning the cam disc after a predetermined period of operation of the escapement mechanism to close the switch whereby to shift the valve means from the first position of regeneration.

11. In a water softener control mechanism, the combination with valve means and a motor for shifting the same from softening position through a plurality of intermediate positions back to softening position, of a normally open switch for the motor circuit adapted to be closed when the softener requires regeneration, whereby to start the cycle of operations of the valve means, a shaft having connection with the valve means and driven through suitable reduction gearing from the motor, the end gear of the train of reduction gearing being mounted on said shaft to turn the same, a cam disc mounted freely on the shaft alongside said gear and having a plurality of oppositely directed cam surfaces on the periphery thereof for throwing the switch in either direction, means on the gear arranged to turn the disc with it to open the switch when the valve means reaches various predetermined positions including softening position, another gear mounted freely on the shaft on the other side of the cam disc, spring means kept wound by the turning of the shaft and having connection with said gear tending to turn the same normally in one direction, an escapement mechanism driven by the gear and arranged to be operated when the valve means is in any position except softening position, and means on the gear for turning the cam disc with it to close the switch after a predetermined period of operation of the escapement mechanism, whereby to predetermine the length of time the valve means is left in any intermediate position.

12. A water softener control mechanism as set forth in claim 11 including a stop on the cam disc for cooperation with the first mentioned gear on the shaft whereby to hold the cam disc against turning relative to said gear with the valve means in softening position, said disc serving in turn to hold the second gear against turning under action of the spring means.

13. A water softener control mechanism as set forth in claim 11 including an auxiliary switch arranged to be closed when the valve means is in softening position.

14. A water softener control mechanism as set forth in claim 11 including an auxiliary switch, and means on the first gear for closing said switch when the gear turns to a position corresponding to the softening position of the valve means.

15. A water softener control mechanism as set forth in claim 11 including a sleeve rotatably mounted on the shaft and having connection with the spring means, said sleeve being arranged to be turned relative to the shaft for tensioning thereof, and means for fastening the sleeve to the shaft in adjusted position.

16. A water softener control mechanism as set forth in claim 15 including a plunger having connection with the switch for operating the same, and a solenoid arranged when energized to communicate a pull to the plunger whereby to automatically close the switch to start the cycle of operations of the valve means.

17. In a water softener control mechanism, the combination with valve means and motive means for shifting the valve means to different operative positions, of another motive means adapted to be set into action when the first named motive means is set into action, a timing means, and means operated by the first named motive means to stop the action thereof after a shifting of the valve means to an operative position and operated by the second named motive means under control of said timing means to cause resumption of the action of said first named motive means for an ensuing shifting of the valve means to another operative position.

18. In a water softener control mechanism, the combination with valve means and a motor therefor adapted to be successively operated for successively shifting the valve means to different operative positions, of a member operated from the motor at every operation thereof and adapted to be independently operated, other motivated slowly movable means arranged to operate said member during interruption of operation of the motor, and a control means alternately operable to start and stop the motor and successively operable by said member to stop the motor after every shifting of the valve means to an operative position and to start the motor at a deferred period after every shifting of the valve means to any position other than normal, the movements of said member to cause the stopping of the motor being imparted from the motor and the movements of said member to cause the subsequent starting being imparted by said other motivated means.

19. In a water softener control mechanism, the combination with valve means and a motor therefor adapted to be successively operated for successively shifting the valve means to different operative positions, of a member operated from the motor at every operation thereof and adapted to be independently operated, other motivated slowly movable means arranged to operate said member during interruption of operation of the motor, and a control means alternately operable to start and stop the motor and successively operable by said member to stop the motor after every shifting of the valve means to an operative position and to start the motor at a deferred period after every shifting of the valve means to any position other than normal, said member having a plurality of devices which as the member is successively operated by the motor successively move the control means to position to stop the motor and another plurality of devices alternating with those first mentioned and which in successive operations of said member by said other motivated means successively move the control means to position to start the motor.

20. In a water softener control mechanism, the combination with valve means and a motor therefor adapted to be successively operated for successively shifting the valve means to different operative positions, of a control means alternately operable to start and stop the motor, a movable member having a plurality of devices adapted to be brought successively into coaction with said control means and arranged for alternately operating said control means to stop and start the motor, means driven by the motor with the valve means having a lost motion connection with said member whereby to operate the same and to permit said member to be advanced relative to said motor-driven means, means yieldingly urged in the same direction that said member is driven, and governing means whereby the movement of said last-named means is restrained to a relatively slow rate, said yieldingly urged means cooperating with said member to permit the more rapid operation thereof by the motor-driven means and thereafter to catch up with said member and advance it relative to said motor-driven means, the devices which operate the control means to stop the motor being brought into play by the operation of said member by the motor-driven means and the devices which operate said control means to start the motor being brought into play by the operation of said member by said yieldingly urged means.

21. In a water softener control mechanism, the combination with valve means and a motor therefor adapted to be successively operated for successively shifting the valve means to different operative positions, of a rotatable member, rotatable means driven by the motor and cooperating with said member to turn the same at every shifting of the valve means to an operative position, said member being capable of a limited independent rotation, a rotatable means having means yieldingly urging the same to rotate in the same direction that said member is rotated when turned by said motor-driven means, said last-named means cooperating with said member to cause such limited independent turning thereof after turning thereof by the motor-driven means, means governing said yieldingly urged rotatable means to cause a slow rate of movement thereof, and means controlling the motor and operated by said rotatable member to stop the motor pursuant to every shifting of the valve means to an operative position and to start the motor at a deferred period after every such shifting of the valve means to any position other than normal.

22. In a water softener control mechanism, the combination with valve means and a motor therefor adapted to be successively operated for successively shifting the valve means to different operative positions, of a control means alternately operable to start and stop the motor, a rotatable member having devices for successively operating said control means for alternately stopping and starting the motor, a driving element therefor driven with the valve means from the motor, and another motivated driving element, said rotary member being coaxial with said driving elements and freely mounted, said motor-driven driving element and member having interengageable devices establishing a lost motion connection between them, said other driving element and member having coactive means permitting the advancing of said member relative to said other element when said member is turned by the motor-driven element and by which said other element may drive said member and advance it relative to the motor-driven element during interruption of operation of the motor, the devices on said member which operate the control means to stop the motor being brought into play by movements of said member imparted by the motor-driven means and the devices which operate said control means to start the motor being brought into play by movements of said member imparted by said other motivated driving element.

23. In a water softener control mechanism, the combination with valve means and an electric motor for successively shifting said valve means to a plurality of positions for softening and regeneration, of switch means for closing a circuit through the motor when the softener requires regeneration whereby to start a cycle of successive shifts of the valve means, means operatively connected with the motor for opening said circuit upon shifting of the valve means to any one of said plurality of positions, a timing mechanism arranged to operate when said valve means is in a position other than softening position, a shaft in said timing mechanism, means for revolving the shaft during operation of the timing mechanism, and means controlled by said shaft for closing the motor circuit after a predetermined number of revolutions of the shaft.

EDWARD P. McCANNA.

CERTIFICATE OF CORRECTION.

Patent No. 1,928,384.                 September 26, 1933.

EDWARD P. McCANNA.

It is hereby certified that error appears in the printed specification of the above numbered patent requiring correction as follows: Page 4, line 8, for "cells" read coils; page 6, line 21, claim 16, for the claim numeral "15" read 11; and that the said Letters Patent should be read with these corrections therein that the same may conform to the record of the case in the Patent Office.
Signed and sealed this 14th day of November, A. D. 1933.

F. M. Hopkins (Seal)                 Acting Commissioner of Patents.

the motor, and another motivated driving element, said rotary member being coaxial with said driving elements and freely mounted, said motor-driven driving element and member having interengageable devices establishing a lost motion connection between them, said other driving element and member having coactive means permitting the advancing of said member relative to said other element when said member is turned by the motor-driven element and by which said other element may drive said member and advance it relative to the motor-driven element during interruption of operation of the motor, the devices on said member which operate the control means to stop the motor being brought into play by movements of said member imparted by the motor-driven means and the devices which operate said control means to start the motor being brought into play by movements of said member imparted by said other motivated driving element.

23. In a water softener control mechanism, the combination with valve means and an electric motor for successively shifting said valve means to a plurality of positions for softening and regeneration, of switch means for closing a circuit through the motor when the softener requires regeneration whereby to start a cycle of successive shifts of the valve means, means operatively connected with the motor for opening said circuit upon shifting of the valve means to any one of said plurality of positions, a timing mechanism arranged to operate when said valve means is in a position other than softening position, a shaft in said timing mechanism, means for revolving the shaft during operation of the timing mechanism, and means controlled by said shaft for closing the motor circuit after a predetermined number of revolutions of the shaft.

EDWARD P. McCANNA.

CERTIFICATE OF CORRECTION.

Patent No. 1,928,384.             September 26, 1933.

EDWARD P. McCANNA.

It is hereby certified that error appears in the printed specification of the above numbered patent requiring correction as follows: Page 4, line 8, for "cells" read coils; page 6, line 21, claim 16, for the claim numeral "15" read 11; and that the said Letters Patent should be read with these corrections therein that the same may conform to the record of the case in the Patent Office.

Signed and sealed this 14th day of November, A. D. 1933.

F. M. Hopkins (Seal)                 Acting Commissioner of Patents.

CERTIFICATE OF CORRECTION.

Patent No. 1,928,384. September 26, 1933.

EDWARD P. McCANNA.

It is hereby certified that error appears in the printed specification of the above numbered patent requiring correction as follows: Page 4, line 8, for "cells" read coils; page 6, line 21, claim 16, for the claim numeral "15" read 11; and that the said Letters Patent should be read with these corrections therein that the same may conform to the record of the case in the Patent Office.

Signed and sealed this 14th day of November, A. D. 1933.

F. M. Hopkins (Seal)

Acting Commissioner of Patents.